Oct. 20, 1936.  E. I. BROWN  2,057,816
PROCESS AND APPARATUS FOR ANNEALING GLASS SHEETS
Filed Jan. 10, 1935  5 Sheets-Sheet 4
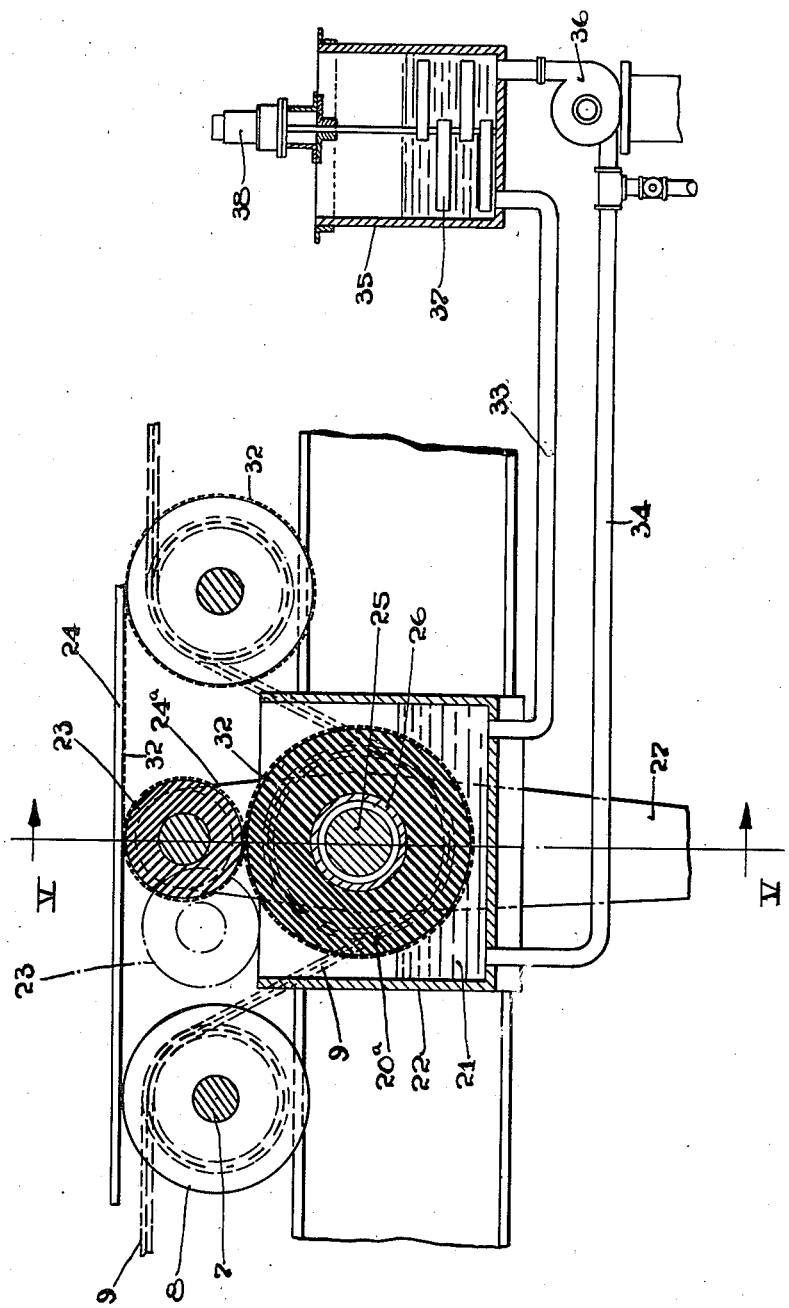
INVENTOR.
E. I. BROWN
BY Bradley & Bee
ATTORNEYS.

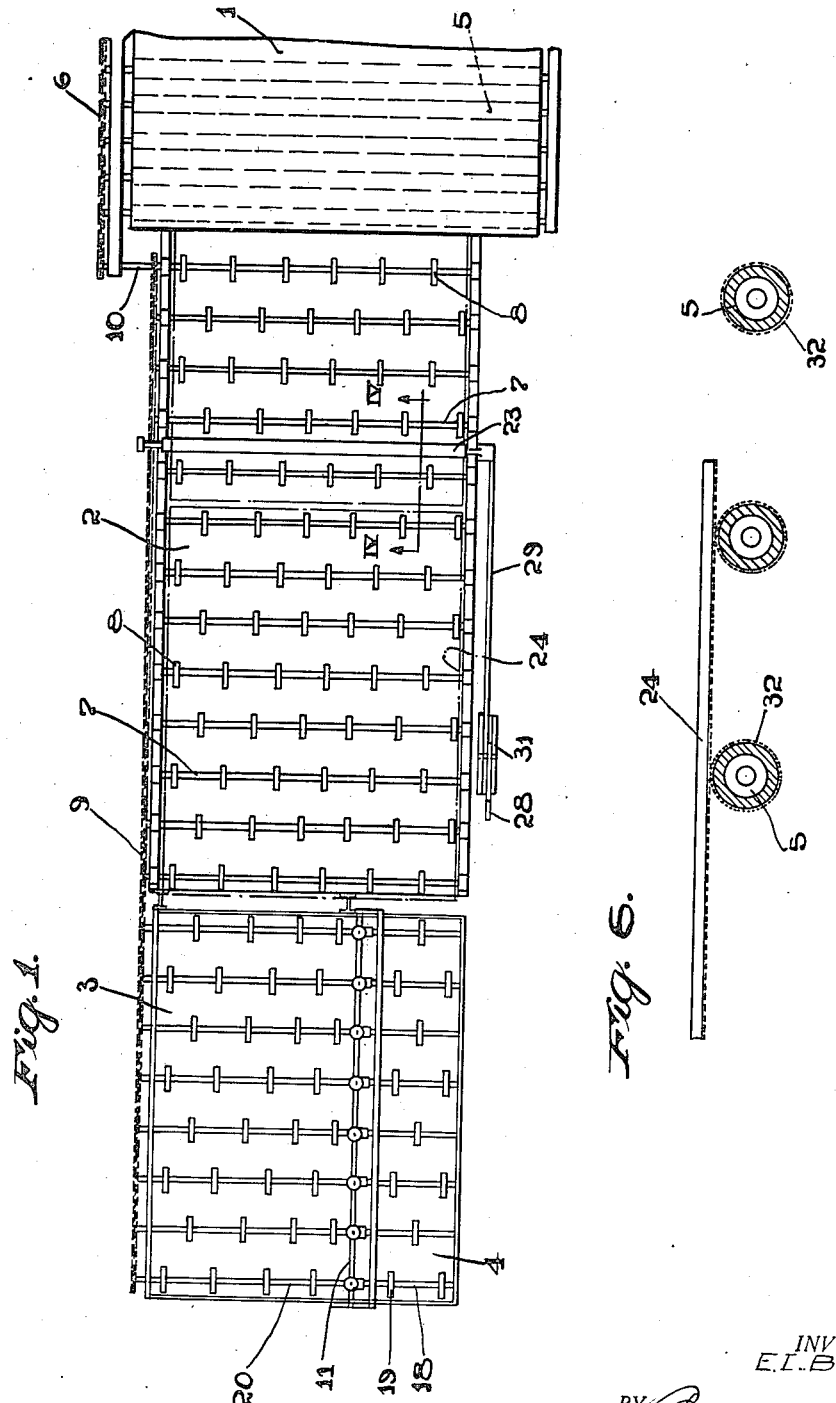

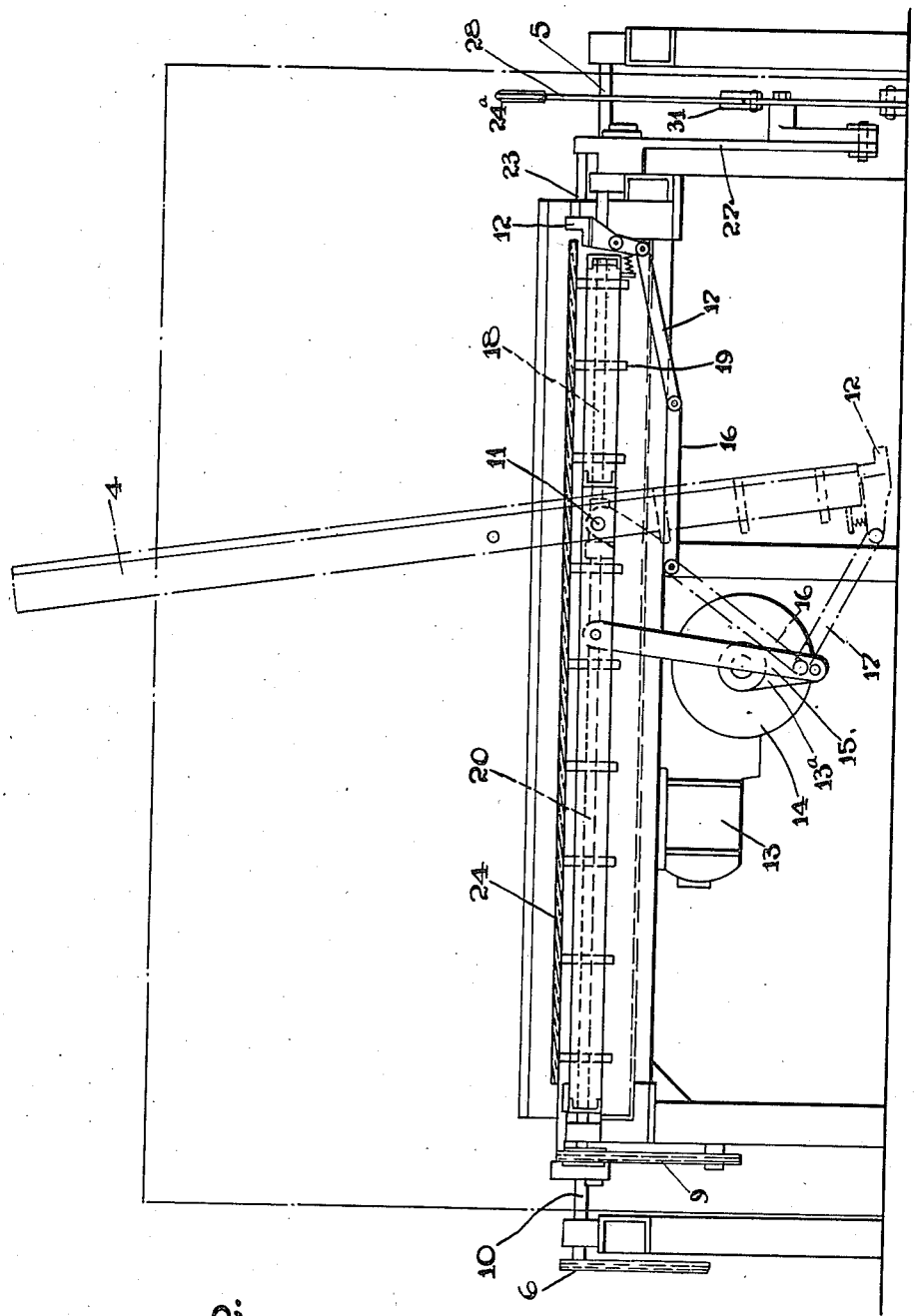

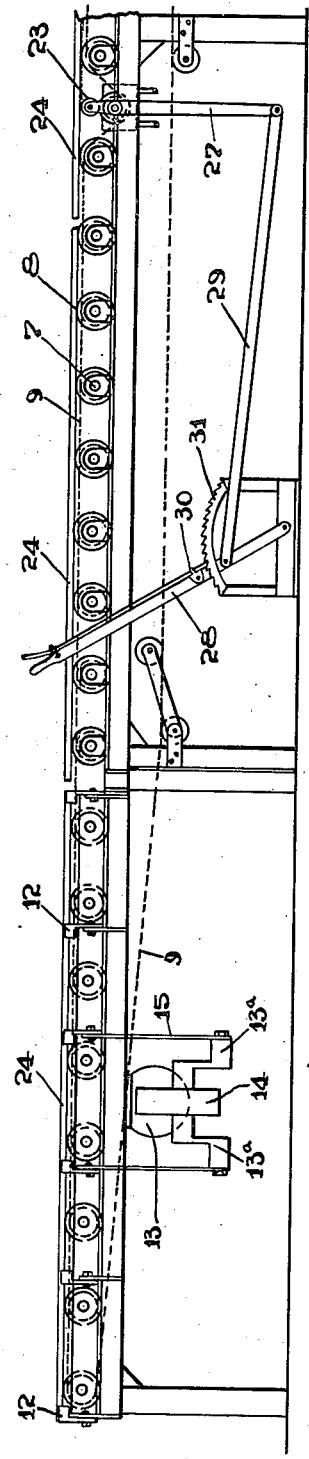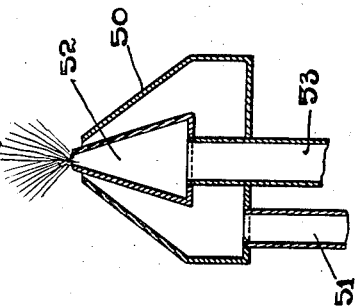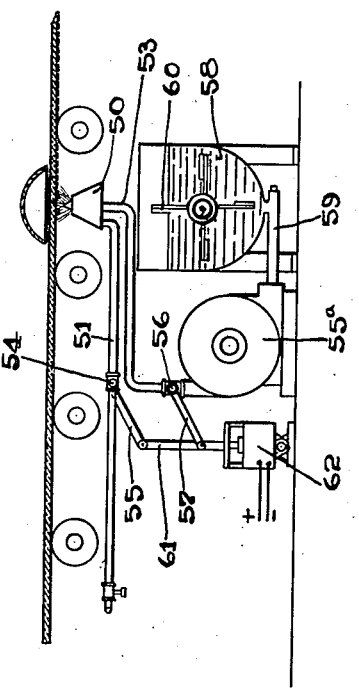

Oct. 20, 1936.                E. I. BROWN                2,057,816
        PROCESS AND APPARATUS FOR ANNEALING GLASS SHEETS
                  Filed Jan. 10, 1935        5 Sheets-Sheet 5

INVENTOR.
E. I. BROWN
BY Bradley & Bee
ATTORNEYS.

Patented Oct. 20, 1936

2,057,816

UNITED STATES PATENT OFFICE 2,057,816

PROCESS AND APPARATUS FOR ANNEALING GLASS SHEETS

Edmund Irving Brown, Tarentum, Pa., assignor to Pittsburgh Plate Glass Company, a corporation of Pennsylvania Application January 10, 1935, Serial No. 1,177

5 Claims. (Cl. 49—47)

Figure 5:
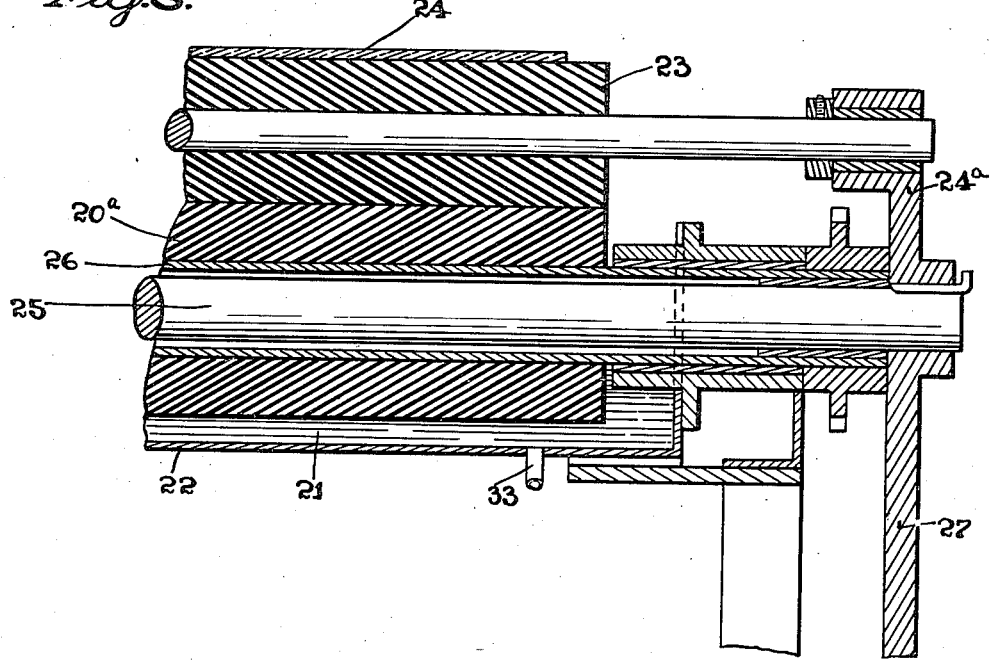
Figure 7:
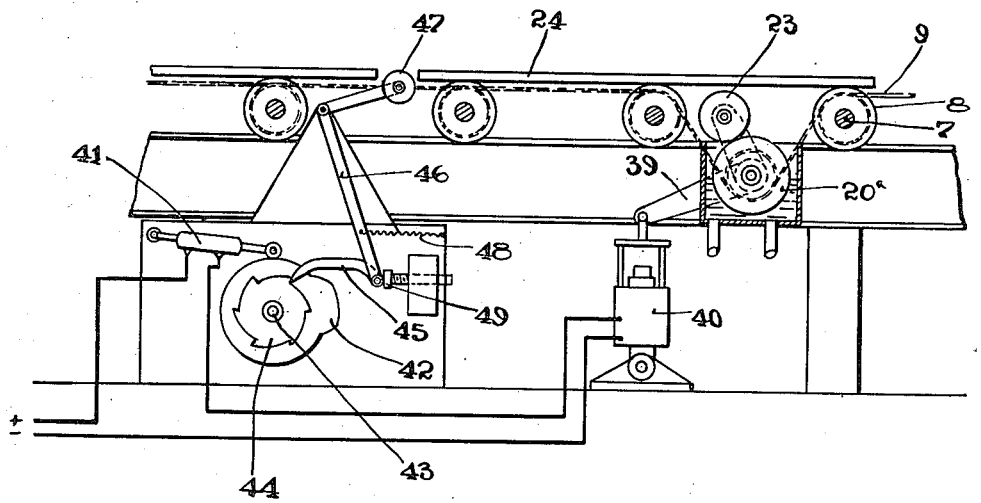

The invention relates to a process and apparatus of the roller type for annealing glass sheets and particularly to means for preventing the rolls from marring the polished surfaces of the sheets as they pass through the leer. The invention has for its objects the provision of cheap simple means and procedure for the protection of the glass sheets from scratching or marring without any requirement for other than the ordinary metal rolls commonly used in roller leers. Briefly stated, this result is accomplished by applying a protective transferable coating, such as plaster of Paris, white-wash or the like, to the under surfaces of a part of the glass sheets as they move over the roller approach runway leading into the leer. The coating thus applied to the sheets, not only protects them from scratching or marring on the metal leer rolls, but provides a method of keeping the leer rolls coated with the protecting material. Due to the fact that the leer rolls become coated, it is not necessary to coat all of the glass plates, one plate in five or six being sufficient, and it is even possible to discontinue the application of the coating to the glass sheets for considerable periods without injury to the glass, as the coating on the rolls, when once established, will last for some time without renewal. The application of the coating is preferably accomplished by a spray beneath the roller approach runway or by a roll which is continuously wetted from a bath of the coating material, but in so far as the process is concerned, the coating might be applied by hand to the sheets on the runway, or before they are placed on the runway. The apparatus is shown in the accompanying drawings, wherein:

Figure 1 is a plan view of the apparatus; Figs. 2 and 3 are end and side elevation views respectively on a larger scale; Fig. 4 is an enlarged section on the line IV—IV of Fig. 1; Fig. 5 is a section on the line V—V of Fig. 4; Fig. 6 is a diagrammatic side elevation view showing the application of coating material to the glass sheets; Fig. 7 is a side elevation illustrating a modification involving the automatic operation of the coating roll; Fig. 8 is a side elevation illustrating the modification involving the use of a spray for coating the glass sheets; and Fig. 9 is an enlarged detail view showing the spray nozzle used in the Fig. 8 construction.

Referring to the drawings, 1 is the roller leer to which the glass sheets are carried to anneal them; 2 is a runway of the roller type over which the sheets pass and on which they are coated on their lower sides, as hereinafter described, and 3 is an extension of the runway 2 on which the glass sheets are placed preferably by means of the tilting table 4. The rolls 5 in the leer are provided at their ends with suitable sprockets driven by a chain 6 which is in turn driven from an electric motor (not shown). The rolls of the runway sections 2 and 3 preferably comprise axles 7 carrying the discs 8 and have at their ends sprockets driven from the chain 9. The chain 9 is driven from the shaft 10 (Fig. 1) provided with two sprockets around which the chains 6 and 9 extend. The sprockets on the shafts 7 of the runway sections are preferably connected thereto with runover clutches, so that they are constantly driven forward by the chain, but also permit the rollers to rotate freely in a forward direction independently of the drive chain, so that the sheets may be rolled along the runways by hand to match them up, that is, get them relatively close together, so that the full capacity of the leer is employed. This is desirable, as it is necessary to apply the sheets to the section 3 intermittently, and with such intermittent application of the sheets, they would normally be spaced apart a considerable distance.

The loading table 4 constitutes no part of the present invention, being fully shown and described in the patent of William Owen, No. 1,983,769. This table is pivoted upon a shaft 11 (Fig. 2) so that the table may occupy either a horizontal position or the upright dotted line position shown in Fig. 2. The dotted line position is the receiving position, and the glass sheets to be annealed are brought to the tilting frame upon vacuum frames, well known in the art, and transferred thereto with their lower edges resting upon the toe 12 at the lower end of the frame. The frame is then tilted to horizontal position, so that the glass sheet rests upon the rolls, and may be carried along therefrom to the rolls on section 2 of the leer. The tilting frame is operated from a motor 13 which drives the crank 13a through suitable reducing gearing in the casing 14. The crank is connected to the end of the frame by means of the link 15. When the frame is moved to horizontal position the toe 12 is moved slightly to the right by means of the links 16 and 17, so that the glass sheet can move forward freely on the rolls without dragging against this toe. The table 4 is provided with shafts 18 carrying the rolls 19 and these shafts are driven at their inner ends through ball and socket joints connected with the shafts 20. The details of this loading table construction are fully set forth in the patent above identified, so that a detailed description is unnecessary.

The means for coating the glass sheets, as they pass over the runway 2 will be seen by reference to Figs. 3, 4 and 5. To accomplish this result a roll 20a is employed having its lower portion in the coating mixture 21 carried in the pan 22, the roll being driven from the chain 9. This roll supplies the coating mixture, such as plaster of Paris, to the roll 23 which, in operative position, engages the lower surface of the glass sheets 24. Both rolls are of soft material, such as rubber which will pick up and carry the coating mixture. The roll 23 is supported upon a pair of arms 24a (Fig. 5) which are keyed to a shaft 25 extending through the hollow shaft 26 of the roll 20, so that the shaft 25 may be rotated independent of the rotation of the driving wheel shaft 26. One of the arms 24a is extended into the arm 27 movable by the lever 28 (Fig. 3) through the link 29, the lever 28 being provided with a pawl 30 which rides over the quadrant 31. When the lever 28 is moved to the right from the position shown in Fig. 3, the arms 24 carrying the roll 23 are tilted to the left so that the roll is lowered to the dotted position shown in Fig. 4, at which time, it is out of contact with the glass sheet. This arrangement is desirable in order to provide for the coating of only a part of the sheets, it being necessary, as heretofore pointed out, to coat only a limited number of sheets, perhaps one in five, as otherwise too much coating material accumulates on the leer rolls 5. Fig. 6 illustrates the transfer of the coating material 32 to the leer rolls 5 from the glass sheet 24, which has been coated by means of the rolls 20a and 23. This coating upon the glass sheets and leer rolls insures that the glass sheets will not be scratched during their passage through the leer.

Fig. 4 illustrates the means preferably employed for circulating the coating mixture in the pan 22 and agitating it. This is accomplished by means of the pipes 33 and 34 leading to the mixing tank, a pump 36 being located in the pipe 34. The mixer is provided with an agitator 37 driven from the motor 38. This provides for the renewal of the mixture in the pan 22 and for maintaining the material in suspension in the water.

Instead of the hand operating means for shifting the coating roll 23, an automatic means may be provided for this purpose, and such a means is shown in Fig. 7, in which the roll 23 is carried upon the bell cranks 39, whose free ends are moved up and down by an electromagnetic thruster 40. The thruster is caused to operate intermittently by means of the switch 41 moved up at intervals by the cam 42. The shaft 43 of the cam is provided with a ratchet wheel 44 driven from the pawl 45. The pawl 45 is moved to the left by means of the bell crank lever 46, whose upper end carries the roll 47 lying in the line of travel of the sheets. The roll 47 is moved down by the ends of the sheets as they move along the runway causing the ratchet 44 to move ahead one notch for each sheet. The ratchet carries six teeth, so that the cam 42 comes into play once for every six sheets, and this results in every sixth sheet being coated. The bell crank lever is moved back after each forward movement by means of a spring 48, an adjustable stop 49 being provided for limiting the movement of the lever to the right.

Figs. 8 and 9 illustrate another modification, in which the lower side of the glass sheets are coated by means of a spray of the desired coating material. The nozzle is located beneath the line of travel of the glass sheets, and consists of an outer cone 50, to which air is supplied under pressure from the pipe 51, and an inner cone 52, to which the coating liquid is supplied through the pipe 53. The pipe 51 is provided with a valve 54 having an operating handle 55. The pipe 53 leads to the pump 55a, and is provided with a valve 56 having the handle 57. The pump is supplied from the mixing tank 58 by means of the pipe 59, the mixing tank being provided with a suitable agitator 60. The handles 55 and 57 of the two valves are operated from a link 61 which is moved up and down by an electromagnetic thruster 62. Such thruster is energized intermittently from a mechanism, such as that described in connection with Fig. 7 and involving the cam with the pawl and ratchet mechanism which is driven by a bell crank lever controlled by the movement of the glass sheets.

In operation, the glass sheets to be coated and annealed are placed on the loading section 3 by the table 4 and then carried forward onto the section 2. They are then carried along such section and over the coating roll 23 which is operated to coat a plate ever so often, as heretofore explained, depending upon requirements. Before the sheets pass into the leer they are brought relatively close together on the runway by the operator who pushes them along with his hand so that the sheets are spaced only a few inches apart when they enter the leer. As the sheets progress through the leer the coating material contacts with the leer rolls, so that in a short time, each roll carries a thin layer of plaster of Paris or other suitable coating material which dries thereon and insures the glass sheets against scratching or marring. After the sheets emerge from the leer, they may be cleaned in any suitable manner, depending upon the character of the coating, such as by the use of an acid bath and cleaning brushes. Coating material, such as plaster of Paris or lime, is removed without difficulty and at practically no additional expense, as in any case the sheets require a cleaning treatment after the annealing operation.

What I claim is:

1. In combination with a roller leer for annealing glass sheets having a roller runway in advance thereof, roller means beneath the line of travel of the sheets on the runway wetted with a refractory coating and means for raising and lowering such means, so that it contacts with the glass sheets at spaced intervals.

2. In combination with a roller leer for annealing glass sheets having a roller runway in advance thereof, a coating roller beneath the line of travel of the sheets on the runway adapted to contact with the lower surfaces of at least a part of the sheets, a bath of a protecting coating mixture from which the coating roller is wetted, and means for circulating and agitating the mixture constituting the bath.

3. In combination with a roller leer for annealing glass sheets having a roller runway in advance thereof, spray means below the line of travel of the glass sheets on the runway governed by the movement of the sheets along the runway for applying a transferable coating of protective material to the under surfaces of the sheets at spaced intervals.

4. In combination with a roller leer for annealing glass sheets having a roller runway in advance thereof, supply means below the line of travel of the glass sheets on the runway for applying a transferable coating of protective material to the under surfaces of the sheets, and means actuated by the movement of the sheets for controlling said supply means whereby the material is applied to the sheets at spaced intervals dependent upon the travel of the sheets.

5. In combination with a roller leer having a roller runway in advance thereof, roller means beneath the line of travel of the sheets on the runway wetted with a refractory coating and means governed by the movement of the sheets along the runway for raising and lowering such means, so that it contacts with the glass sheets at spaced intervals.

E. IRVING BROWN.